(12) United States Patent
Millett

(10) Patent No.: US 6,967,775 B1
(45) Date of Patent: Nov. 22, 2005

(54) ZOOM DOT SIGHTING SYSTEM

(75) Inventor: James A. Millett, Ramona, CA (US)

(73) Assignee: Millett Industries, Inc., Huntington Beach, CA (US)

( * ) Notice: Subject to any disclaimer, the term of this patent is extended or adjusted under 35 U.S.C. 154(b) by 0 days.

(21) Appl. No.: 10/889,041

(22) Filed: Jul. 13, 2004

(51) Int. Cl.[7] .............................................. G02B 23/00
(52) U.S. Cl. ...................... 359/399; 359/405; 359/432; 42/132
(58) Field of Search ................................ 359/399–429, 359/676–680, 800–819; 356/251, 254; 42/101–145

(56) References Cited

U.S. PATENT DOCUMENTS

| | | | | |
|---|---|---|---|---|
| 3,994,597 A | * | 11/1976 | Calder et al. ................ | 356/251 |
| 4,346,995 A | * | 8/1982 | Morris ........................ | 356/251 |
| 4,658,139 A | * | 4/1987 | Brennan et al. ............. | 250/330 |
| 4,665,662 A | * | 5/1987 | Swanborn .................... | 52/235 |
| 4,764,011 A | * | 8/1988 | Goldstein .................... | 356/251 |
| 4,877,324 A | * | 10/1989 | Hauri et al. ................. | 356/251 |
| 5,653,034 A | * | 8/1997 | Bindon ......................... | 42/131 |

* cited by examiner

Primary Examiner—Thong Q Nguyen
(74) Attorney, Agent, or Firm—G. Donald Weber, Jr.

(57) ABSTRACT

The present invention relates to an improved off-axis optical sighting system for a weapon or the like to provide a means to infinitely vary the size of the dot image seen by the user's eye.

20 Claims, 3 Drawing Sheets

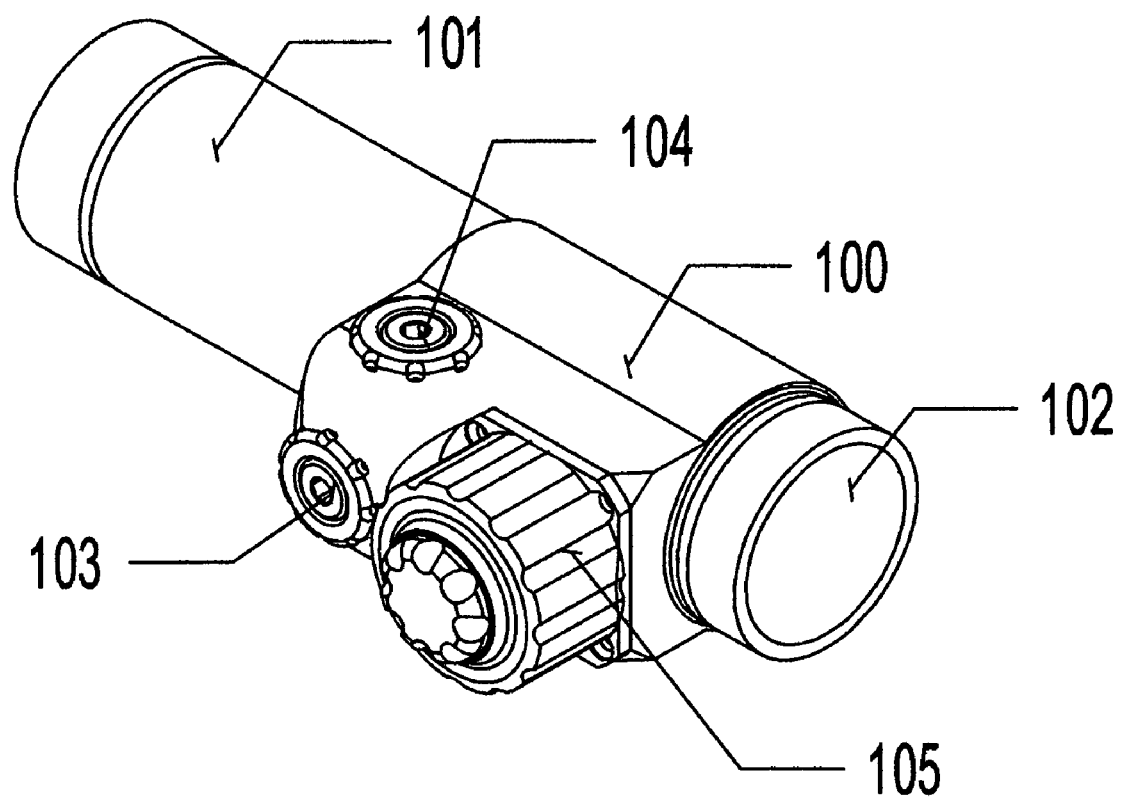
Fig: 1

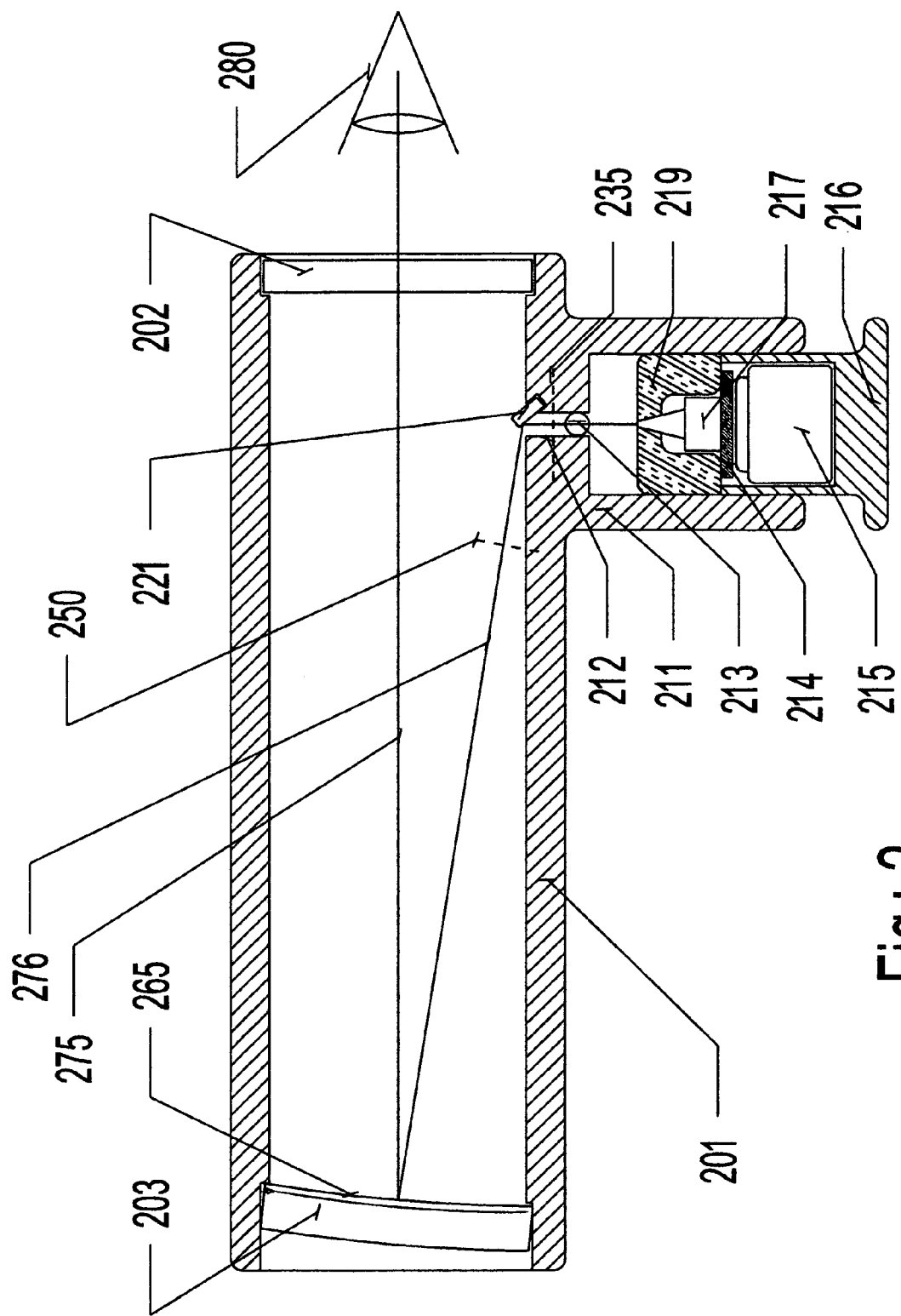
Fig: 2

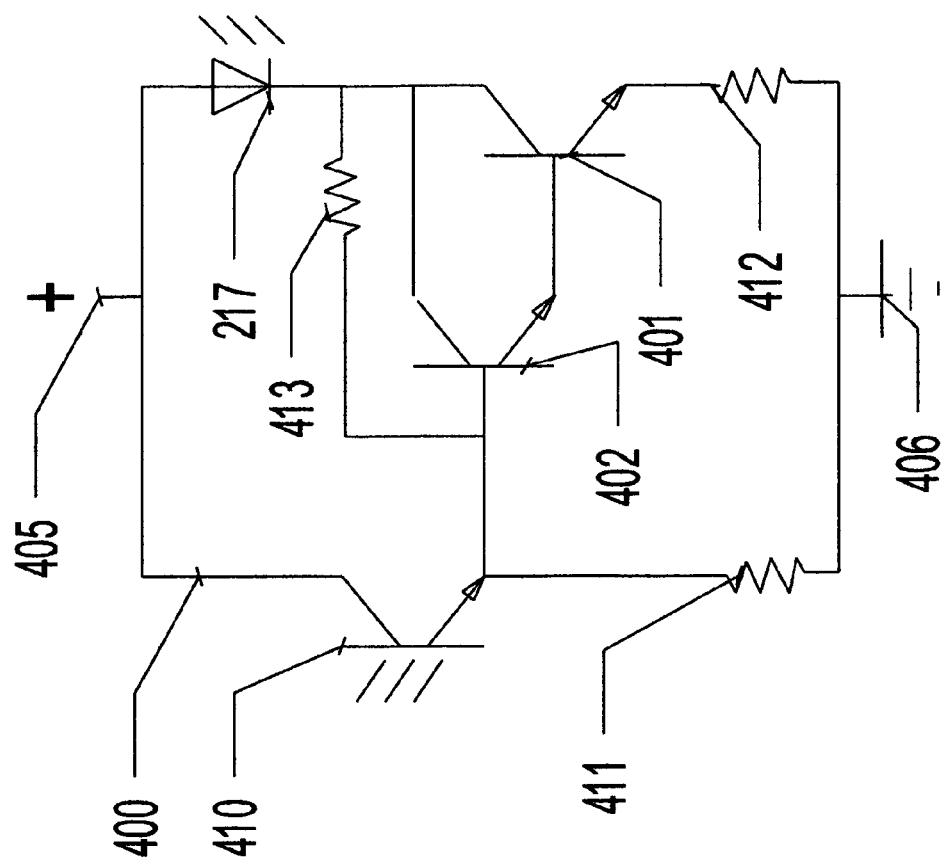
Fig: 4
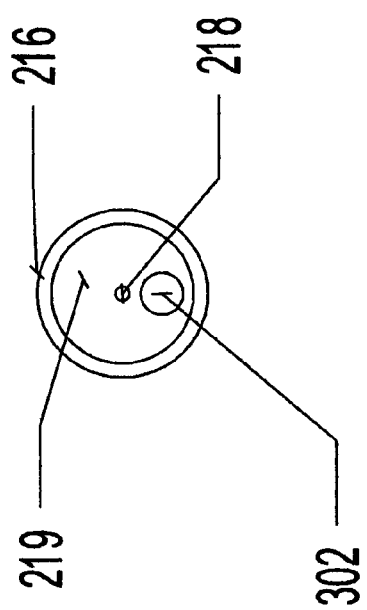
Fig: 3

ZOOM DOT SIGHTING SYSTEM

BACKGROUND OF THE INVENTION

1. Field of the Invention

This invention relates to sighting systems, in general, and to sighting systems with a zoom-aiming dot, in particular.

2. Prior Art

In many aiming or sighting situations, for example, shooting of weapons, an aiming dot is produced in the aiming or sighting apparatus, Also, it is desirable to have different dot sizes for different shooting situations. For example, in fast shooting a large dot size if often preferred, whereas precise shooting requires a small dot size. Off-axis sighting systems currently available use a mask, usually a thin metal foil placed in front of a light source to provide the desired dot. More recently, means have been provided to interpose different size masks in front of the light source as described in U.S. Pat. No. 5,508,843 to S. Tomita, to provide different size dots in the aiming system.

SUMMARY OF THE INSTANT INVENTION

The present invention provides an apparatus which is capable of varying the size of the light image, i.e., the dot, in the sighting apparatus by placing one or more intermediate optical lenses between the sighting lens off-axis image plane and the light source mask. By changing the distance between the intermediate lens and the mirror lens image plane, or the distance between the lens and the light source mask, the magnification of the light lens is changed and, therefore, the apparent size of the light source image or dot is changed, as well.

BRIEF DESCRIPTION OF THE DRAWINGS

FIG. 1 is a perspective view of the exterior of one embodiment of the subject system.

FIG. 2 is a schematic representation of one embodiment of the optical portion of the system.

FIG. 3 is a schematic representation of one embodiment of the apparatus with an adjustment capability.

FIG. 4 is a representative schematic circuit diagram for the control circuitry.

DESCRIPTION OF A PREFERRED EMBODIMENT

Referring now to FIG. 1, there is shown a representative external view of one embodiment of the sighting system 100 of the instant invention. Of course other configurations can be utilized depending upon the actual use of the aiming system, e.g. with a rifle, with a handgun or with other types of devices.

In FIG. 1, the system 100 includes an elongated tubular housing 101 which provides the foundation for precise lens alignment and other components of the system 100.

The housing 101 can be fabricated of any suitable material such as metal, plastic or the like. Rear lens 102 and front lens (not shown in FIG. 1) are mounted on the housing 101 in a conventional manner to assure proper support for precise lens alignment. For example, O-rings, synthetic grease and water-resistant sealants can be used to mount the lenses in order to protect against fogging, leaking and the like. Conventional windage adjustments 103 and elevation adjustments 104 can be used to provide windage and elevation adjustment and the like. A zoom control adjustment 105 is provided to vary the size of the zoom dot in the apparatus.

Referring now to FIG. 2 there is shown a schematic representation of one embodiment of the optical zooming system of the instant invention.

The housing 201 is similar in fabrication and function to housing 101 shown in FIG. 1 although the specific configuration may be different.

The rear lens 202 is, typically, fabricated of a flat glass and may be mounted in the housing 201 or in a separate eyepiece. The mirror lens 203 is, typically, a forward curved meniscus lens that causes no magnification when viewed straight through.

In this apparatus the inner surface of the lens 203 is coated with a suitable red reflective coating 265 known in the art applied in any conventional manner. The curved mirror lens 203 and the coating 265 thereon causes red light from the light source 217 (described infra) to be collimated and reflected as parallel rays 275 to the observer's eye which is represented schematically by eye 280.

A side-mounted chamber 211 is attached to or integrally formed with the housing 201. Chamber 211 is, generally, cylindrical in configuration and is used to mount and retain a power source 215 (typically, a lithium battery) which is threadedly secured in the chamber 211 by a threaded cap 216 which is selectively removable from the chamber.

A small aperture 212 communicates with the interiors of housing 201 and chamber 211. In the present embodiment, a glass ball 213, typically about 1/16 inch diameter, is used as an intermediate lens. The lens 213, which can be a sphere or other suitable shape is, typically, fabricated of glass or plastic and is mounted in the aperture 212 so as to receive the light beam from the LED 217 via conical light pipe 218 as described infra. The lens 213 is maintained in a fixed position in aperture 212 by means of a press fit or an appropriate and suitable adhesive so that the lens 213 remains in fixed position in relation to the mirror lens image plane 235. (In this description, image plane is synonymous with the focal point of the mirror lens 203.)

A suitable light source 217, such as a light emitting diode (LED), is electrically connected to the power source 215 in any suitable fashion such as circuit board 214 as described infra. The LED 217 produces red light. A cone-shaped light pipe 218 of suitable clear plastic or the like is glued to or otherwise positioned in front of the face of LED 217 to direct and focus the majority of the light from the LED 217 to a small diameter to obtain a precise light beam for use in the sighting apparatus.

In this embodiment, the LED 217 and control circuitry (see infra) together with light pipe 218 are mounted on circuit board 214 of suitable construction. A light mask 219 which is, typically, fabricated of metal or black opaque plastic, and has a tapered hole to mate with the light pipe 218 is placed over the light pipe. After the light pipe 218 and light mask 219 are mated together, the upper end surface (as seen in FIG. 2) is lapped flat to produce a round dot image, and threadedly inserted into chamber 211.

Thus, when the LED 217 is activated by connection to battery 215, the light emitted thereby is passed through light pipe 218, lens 213 and reflected by mirror 221 along the principal ray path 276. The reflected beam of red light is directed at sighting lens 203 where it is collimated and is reflected along line 275 and appears as a red dot to the user 280, as described supra.

The light mask 219 and light source 217 are moved in unison relative to the intermediate spherical lens 213, by screwing the battery cap 216 in or out of side chamber 211.

In the preferred embodiment, the light mask 219, LED 217, and circuit board 214 are moved in and out by turning a knob 216 (which may take the form of a battery cover) that moves the battery 215 in and out in the chamber 211. If the knob 216 is unscrewed far enough, the battery 215 disconnects from the circuit board 214 and the associated control circuitry thereon, thus, turning off the LED.

This relative positioning produces a magnification range of approximately 5:1. An out of focus condition on the mirror lens 203 may occur within this range due to the fact that the ball lens 213 is stationary in relation to the image plane 235. However, this condition merely results in a softening of the red dot image and is usually found to be acceptable.

In the preferred embodiment, a phototransistor 410 (see FIG. 4) is mounted on circuit board 214 adjacent to the LED 217 in the apparatus. The phototransistor senses ambient light that comes through the mirror lens 203 and is reflected through a second aperture 302 (see FIG. 3) in the apparatus to the phototransistor mounted on the circuit board 214. The phototransistor and associated control circuitry will control the intensity of the LED 217 based on the amount of ambient light present at the target area. A suitable control circuit can be provided to control the intensity of the LED 217.

Referring now to FIG. 3, there is shown a representation of the inner end of the elements secured in side chamber 211.

In particular, the light mask 219 is shown mounted on the battery cap 216. (See also FIG. 2) The internal end of light pipe 218 is shown passing through the light mask 219. The aperture 302 is aligned with the phototransistor 410 shown in FIG. 4.

The aperture 302 can be understood to pass through the side portions of light mask 219 which are shown to the left or right of the light pipe 218 in FIG. 3, if so desired.

In operation, the ambient light entering the left end of the apparatus as shown in FIG. 2 is reflected by mirror 221 through aperture 302 onto the phototransistor to control the operating level of LED 217 to automatically and rapidly compensate the brilliance of the red dot as a function of ambient light.

Referring now to FIG. 4, there is shown a representative control circuit 400 for the instant invention.

The circuit 400 comprises a basic Darlington-type circuit with transistors 401 and 402 connected in conventional fashion between the positive and negative supply terminals 405 and 406, respectively, which are the terminals of power source 215.

More particularly, a light detector 410 (typically, a light sensitive diode) is connected in series with the voltage drop resistor 411 across the battery. This voltage divider network establishes a variable voltage level at the base electrode of transistor 402 as a function of the resistance of sensor 410 which resistance varies as a function of the intensity of the light applied thereto.

Likewise, the light emitting diode 217 is connected in series with the conductive path of transistor 401. Consequently, as the current through transistor 401 and, thus, LED 217, increases, the more light emitted by the LED. The current limiting resistors 412 and 413 limit the drain on the battery and the current through the other components.

In the apparatus of the invention, the circuit 400 is mounted on the circuit board 214 in conventional manner. The LED 217 is positioned as shown in FIGS. 2 and 3 relative the light pipe 218 and the other components.

The light sensitive diode 410 is positioned on circuit board 214 adjacent to the aperture 302 in the light mask 219 as shown in FIG. 4.

Thus, ambient light entering the sight 100 via lens 203 is reflected by mirror 221 through aperture 302 in light mask 219 onto the light sensor 410 on circuit board 214. The greater the ambient light, the greater the light emitted by LED 217. This light sensitivity permits the sighting apparatus 100 to be virtually instantaneously adapted from a low ambient light to a high ambient light condition as might be encountered in many circumstances.

In another embodiment, mirror 221 can be movably mounted such that windage and elevation screws (not shown) adjust the angle thereof, and, therefore, adjusts the point at which the light beam 276 is reflected onto the sighting lens 203 and the angle at which the dot image is reflected to the eye 280 along parallel ray 275.

In yet another embodiment, it is contemplated that mirror 221 can be omitted from the system. In this latter arrangement, the ball lens 213, light mask 219 and LED 217 would be placed coaxial to the principal ray 275. In this configuration, mirror 221 is utilized to make the housing configuration more desirable.

In the present embodiment, the image plane 235 and the lens 213 are fixed. Only the object, i.e., the light mask 219 and light pipe 218 are movable. This presents an out of focus condition for all magnifications except one with a maximum out of focus condition through a 5:1 change in magnification as discussed supra.

To vary the magnification of the ball lens 213 and maintain proper focus on the light mask 219, it is necessary to move both the ball lens 213 and the light mask 219 in relation to the image plane 235 of mirror lens 203. Alternatively, it is contemplated to use multiple lenses and to move both (all) lenses in relation to the image plane 235 of mirror lens 203 while keeping the position of light mask 219 fixed. Any of these contemplated alternative methods will cause the final dot image size at the eye 280 to be variable.

It is also conceivable that a movable lens or lenses could be placed between the mirror lens 203 and the mirror lens image plane 235, for example, at location 250 (shown in dashed outline). In this case, the light mask 219 would be placed at the image plane 235 which then could be fixed or movable and the contemplated movable lens or lenses would achieve the same resultant variable image size.

There are many combinations of lenses and movements to cause a change in magnification of the dot image, i.e. a zoom effect, which is commonly understood by those familiar with optics. It is assumed that all those arrangements are contemplated in the forgoing descriptions.

To those familiar with optics, the terms object and image refer to an object placed a distance from a lens or lens system and a plane some distance from the lens or lens system on which all light rays from the object conjugate to form an image of the object.

It is also contemplated that the invention can be used in a panoramic sighting system. In such a system, the housing 201 can be omitted and the forward lens 203 extends upwardly from the basic support device which is attached to a weapon or the like. The remainder of the apparatus 100 is also attached to the basic support which is equivalent to the lower section of housing 201 shown in FIG. 1.

Thus, there is shown and described a zoom dot sighting system. While this description is directed to particular embodiments, it is understood that those skilled in the art may conceive modifications and/or variations to the specific embodiments shown and described herein. Any such modifications or variations which within the purview of this description are intended to be included therein as well. It is understood that the description herein is intended to be illustrative only and is not intended to be limitative. Rather, the scope of the invention described herein is limited only by the claims appended hereto.

What is claimed is:

1. An off-axis variable dot size sighting system comprising,
a housing having a sighting axis therethrough,
a transparent, non-magnifying sighting mirror lens mounted adjacent one end of said housing,
said sighting mirror lens having a concave spherical surface which has a focal plane,
a coating on said concave spherical surface of said sighting mirror lens which coating reflects a specified color but is transparent to all other portions of the visible light spectrum,
a light source mounted to said housing for projecting a beam of light toward said focal plane of said sighting mirror lens,
at least one control lens mounted adjacent to said light source and interposed in said light beam from said light source to focus an image of said light beam at said focal plane, and
a reflecting mirror mounted in said housing at an angle to said sighting axis to reflect said image of said light beam from said focal plane to said sighting mirror lens whereby said beam of light is collimated by said sighting mirror lens and reflected along said sighting axis to the opposite end of said housing,
at least one of said control lens and said light source being movable relative to the other to alter the size of said image of said light beam.

2. The system recited in claim 1 wherein,
said control lens is spherical in configuration.

3. The system recited in claim 1 wherein,
said light source is a light emitting diode.

4. The system recited in claim 1 wherein,
said light source includes a light intensity adjustment means adjacent to the output of said light source.

5. The system recited in claim 4 wherein,
said sighting mirror lens collimates and reflects a light dot generated by said light source and also transfers the ambient light coming through said sighting mirror lens.

6. The system recited in claim 1 wherein,
said housing includes a chamber adjacent to the side of said housing,
said chamber adapted to receive said light source and said control lens.

7. The system recited in claim 6 wherein,
said light source is movably mounted in said chamber.

8. The system recited in claim 6 including,
an aperture which communicates between said housing and said chamber and is used to support said control lens therein.

9. The system recited in claim 1 including,
a light mask substantially surrounding said light source.

10. The system recited in claim 1 including,
a power source connected to said light source.

11. The system recited in claim 10 wherein,
said power source is a battery.

12. The system recited in claim 1 wherein,
said control lens is fixed in position relative to said focal plane of said sighting mirror lens.

13. A zoom dot aiming system comprising,
a sighting support,
a mirror lens which is transparent and concave mounted to said sighting support,
a light source mounted to said sighting support and adapted to provide a light beam which is projected onto said mirror lens where said light beam is collimated and reflected by said mirror lens, and
a control lens mounted on said sighting support interposed between said light source and said mirror lens to form said beam of light into a dot of light,
at least one of said control lens and said light source being movable relative to the other to change the size of said dot of light.

14. The system recited in claim 13 wherein,
said control lens is spherical in configuration.

15. The system recited in claim 13 wherein,
said light source is a light emitting diode.

16. The system recited in claim 13 wherein,
said light source includes a light intensity adjustment means adjacent to the output of said light source.

17. The system recited in claim 13 wherein,
the sighting support comprises an elongated cylinder.

18. The system recited in claim 13 including,
a reflecting mirror mounted to said sighting support intermediate said control lens and said mirror lens to direct said dot of light to said mirror lens.

19. An off-axis variable dot size sighting system comprising,
a housing having a sighting axis therethrough,
a transparent, non-magnifying sighting mirror lens mounted adjacent one end of said housing,
said sighting mirror lens having a concave spherical surface which has a focal plane,
a coating on said concave spherical surface of said sighting mirror lens which coating reflects a specified color but is transparent to all other portions of the visible light spectrum,
a light source mounted to said housing for projecting a beam of light toward said focal plane of said sighting mirror lens,
a control lens mounted adjacent to said light source and interposed in said light beam from said light source to focus an image of said light beam at said focal plane of said sighting mirror lens whereby said beam of light is collimated by said sighting mirror lens and reflected along said sighting axis to the opposite end of said housing, and
means for moving at least one of said control lens and said light source relative to the other in order to alter the size of said image and the beam of light reflected by said sighting mirror lens.

20. The system recited in claim 19 wherein,
said light source produces a beam of red light.

* * * * *